US012534309B2

(12) United States Patent
Ross et al.

(10) Patent No.: US 12,534,309 B2
(45) Date of Patent: Jan. 27, 2026

(54) APPARATUS FOR SEPARATING AND CONVEYING ROOT CROPS

(71) Applicant: Grimme Landmaschinenfabrik GmbH & Co. KG, Damme (DE)

(72) Inventors: Julian Ross, Eslohe (DE); Wolfram Strothmann, Osnabrück (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 18/005,203

(22) PCT Filed: Jul. 13, 2021

(86) PCT No.: PCT/EP2021/069528
§ 371 (c)(1),
(2) Date: Jan. 12, 2023

(87) PCT Pub. No.: WO2022/013255
PCT Pub. Date: Jan. 20, 2022

(65) Prior Publication Data
US 2023/0219769 A1  Jul. 13, 2023

(30) Foreign Application Priority Data
Jul. 13, 2020 (DE) .................... 10 2020 118 423.9

(51) Int. Cl.
*B65G 47/28* (2006.01)
*B65G 47/76* (2006.01)

(52) U.S. Cl.
CPC ........... *B65G 47/28* (2013.01); *B65G 47/766* (2013.01); *B65G 2814/0258* (2013.01)

(58) Field of Classification Search
CPC ................. B65G 47/28; B65G 47/766; B65G 2814/0258
See application file for complete search history.

(56) References Cited

U.S. PATENT DOCUMENTS

| 2,015,549 A | | 9/1935 | Dwyer et al. |
| 3,679,050 A | * | 7/1972 | Anderson .............. A01D 17/10 198/848 |

(Continued)

FOREIGN PATENT DOCUMENTS

| CN | 105123074 A | | 12/2015 |
| DE | 819012 C | * | 10/1951 |

(Continued)

OTHER PUBLICATIONS

CA3008959 2018.*
JP H0275511U (Year: 1990).*

*Primary Examiner* — Gene O Crawford
*Assistant Examiner* — Lester III Rushin
(74) *Attorney, Agent, or Firm* — Husch Blackwell LLP

(57) ABSTRACT

An apparatus for conveying root crops is provided. The apparatus includes a carrying device which circulates in a circulation direction during operation. The carrying device partly forms at least one receiving region and carries the root crops. At least one transverse separating device extends at least partially in a transverse direction. This delimits the receiving region in the circulation direction. From the outside, the receiving region adjoins an interior space which extends inside an interior space surface. The interior space surface extends parallel to the transverse direction and in side view runs exclusively in the circulation direction. At least one protruding part of the transverse separating device is arranged, in side view, outside the interior space.

17 Claims, 19 Drawing Sheets

(56) References Cited

U.S. PATENT DOCUMENTS

| | | | |
|---|---|---|---|
| 4,281,764 A | | 8/1981 | Fowler, Jr. |
| 4,629,005 A | * | 12/1986 | Hood, Jr. ............... A01D 31/00 |
| | | | 171/25 |
| 6,626,284 B2 | * | 9/2003 | Weston ................. B65G 15/52 |
| | | | 198/692 |
| 7,051,505 B2 | * | 5/2006 | Brannstrom ......... A01D 45/006 |
| | | | 56/134 |
| 2004/0050029 A1 | | 3/2004 | Brannstrom |
| 2009/0057107 A1 | | 3/2009 | Pellenc et al. |
| 2012/0043263 A1 | | 2/2012 | Kalverkamp |

FOREIGN PATENT DOCUMENTS

| | | |
|---|---|---|
| DE | 102017124170 A1 | 4/2019 |
| EP | 1169903 A1 | 1/2002 |
| GB | 1211630 A | 11/1970 |
| GB | 2070978 A | 9/1981 |
| JP | S5730210 U | 2/1982 |
| JP | S58117820 U | 8/1983 |
| JP | H0175511 | 5/1989 |
| JP | H0275511 A | 3/1990 |
| JP | H1075614 A | 3/1998 |

\* cited by examiner

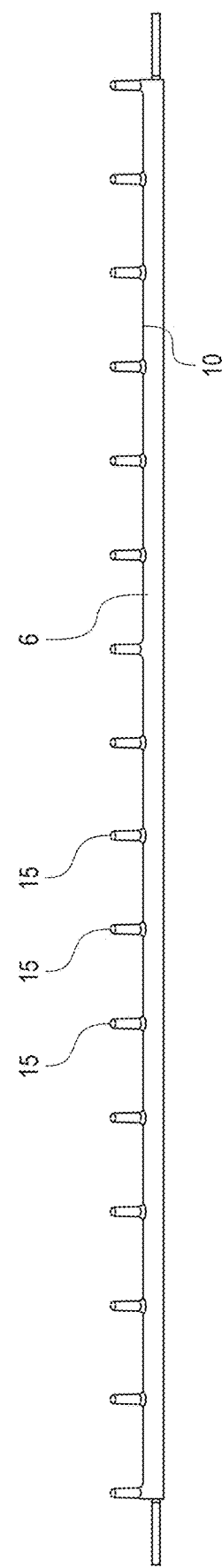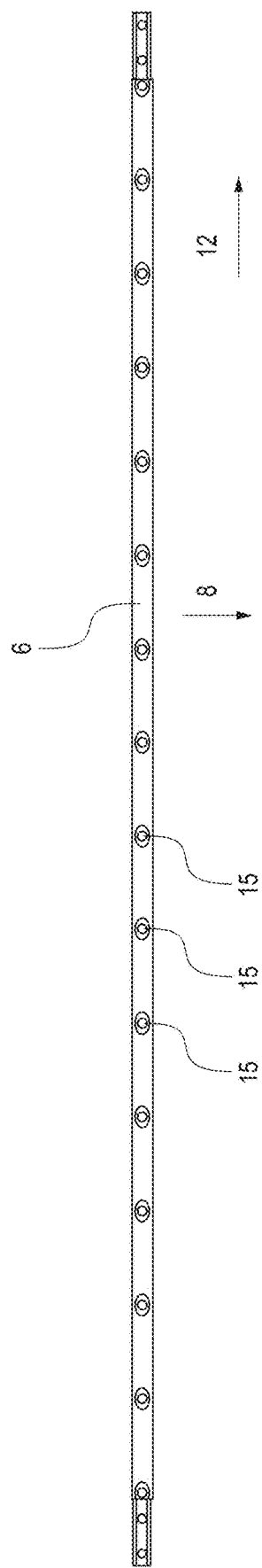

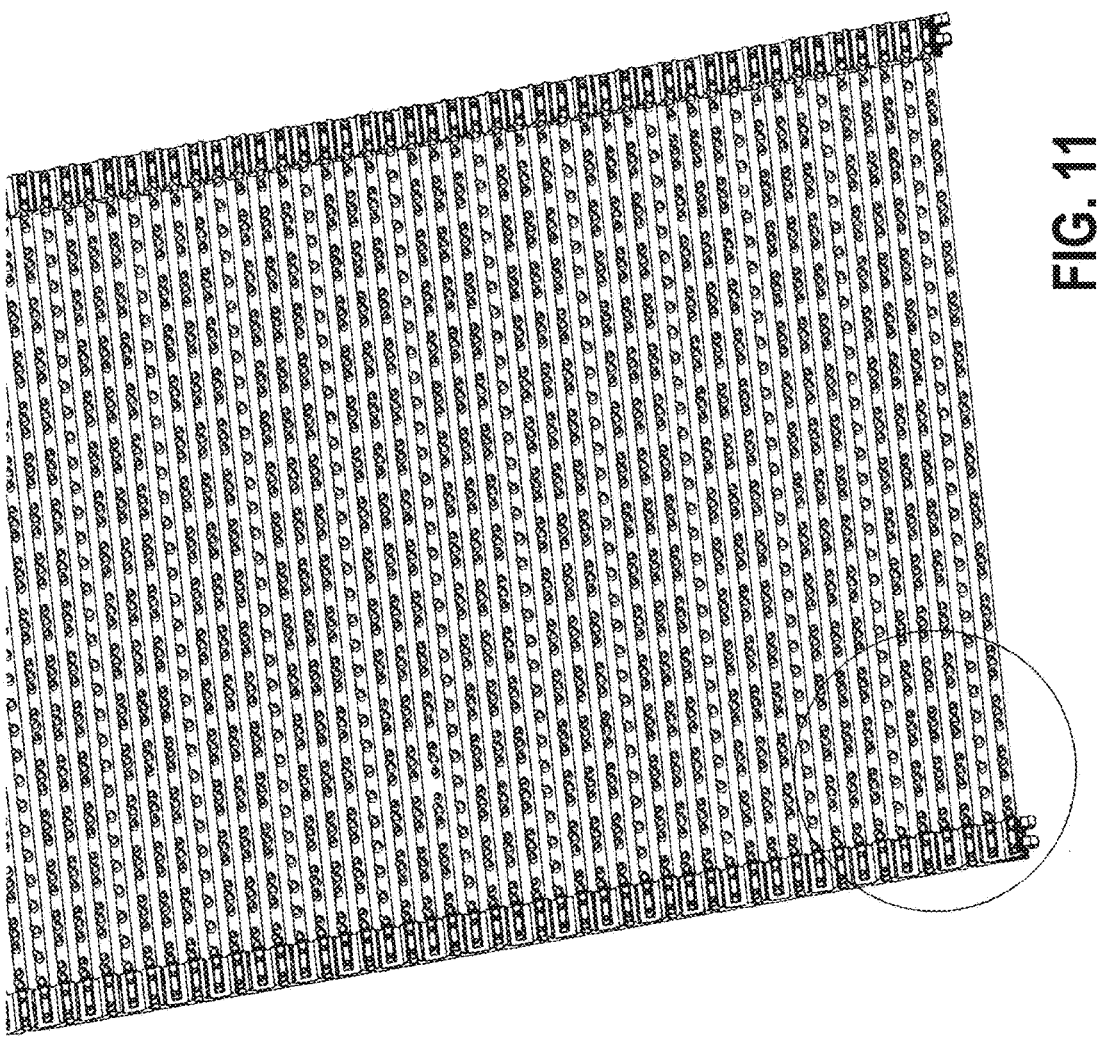
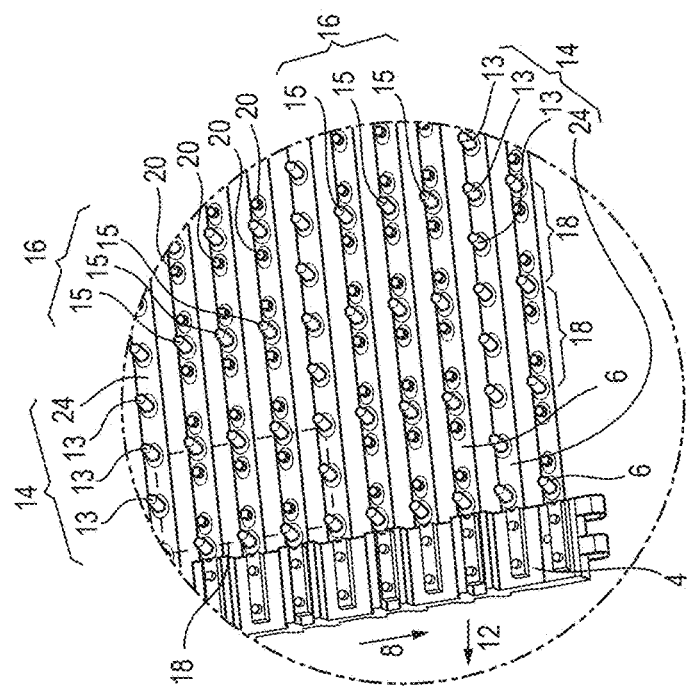
FIG. 11

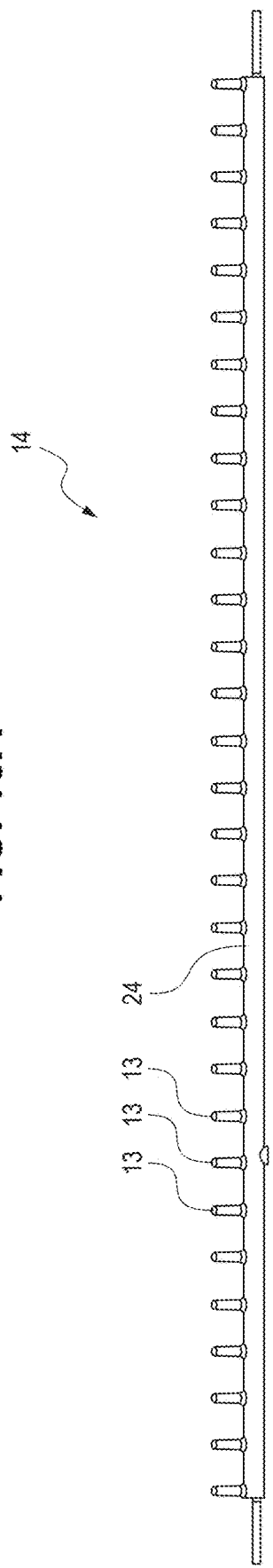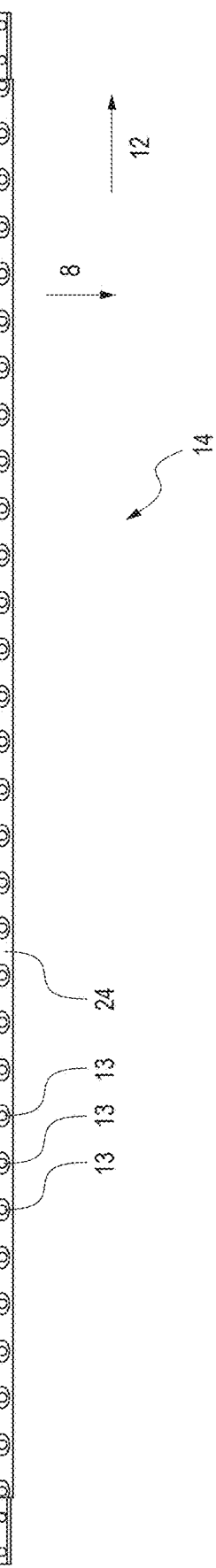

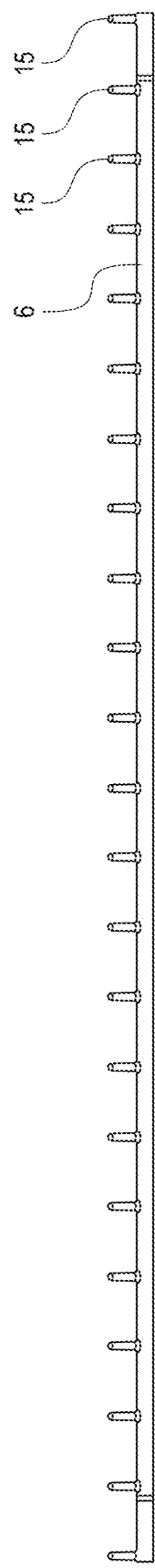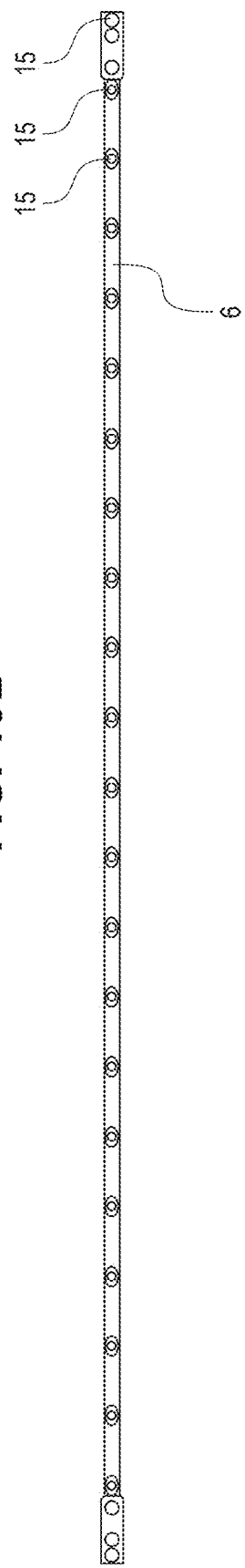

APPARATUS FOR SEPARATING AND CONVEYING ROOT CROPS

CROSS REFERENCE

This application claims priority to PCT Application No. PCT/EP2021/069528, filed Jul. 13, 2021, which itself claims priority to German Patent Application No. 10 2020 118423.9, filed Jul. 13, 2020, the entireties of both of which are hereby incorporated by reference.

FIELD OF THE INVENTION

The invention concerns an apparatus for conveying root crops, comprising a carrying device which circulates in a circulation direction during operation. The carrying device partly forms at least one receiving region and is configured to carry the root crops. The apparatus also comprises at least one transverse separating device which extends at least partially in a transverse direction. This delimits the receiving region in the circulation direction. From the outside, the receiving region adjoins an interior space which extends inside an interior space surface. The interior space surface extends parallel to the transverse direction and in side view runs exclusively in the circulation direction. At least one protruding part of the transverse separating device is arranged, in side view, outside the interior space.

BACKGROUND OF THE INVENTION

During operation, root vegetables lie on the carrying device and circulate with the apparatus in portions. The transverse separating device forms a barrier for the at least one root vegetable arranged in the receiving region, and prevents or hinders the root vegetable from leaving the receiving region during operation. In the transverse direction, the receiving region usually runs at least substantially over the entire width of the apparatus. The at least one root vegetable is free to move inside the receiving region.

The disadvantage with the known generic devices is that during operation, many root vegetables are present in the same receiving region; for effective use of the apparatus, these are present in the receiving region in cyclic fashion, leading to an arrangement of root crops in several layers on the carrying device. In particular because of the tilting of the device which usually occurs during operation, the root vegetables present in the receiving region are concentrated in one part thereof where they lie on top of one another, while another part of the receiving region is clear of root vegetables. This phenomenon hinders viewing or monitoring of the root crops and the finding of foreign bodies to be ejected.

BRIEF SUMMARY OF THE INVENTION

The object of the present invention is to provide a generic apparatus which simplifies viewing or monitoring of root crops conveyed thereby.

According to the invention, the apparatus has at least one longitudinal separating device which extends at an angle, in particular at right angles, to the extent direction of the transverse separating device and parallel to the interior space surface. At least one protruding part of the longitudinal separating device is arranged, in side view, outside the interior space. The longitudinal separating device delimits from one another two receiving regions which are adjacent in the transverse direction.

With this structure of the apparatus, for the same apparatus width, more and narrower receiving regions are created in the transverse direction which, for the same conveying power, each receive a smaller number of root vegetables. When the apparatus has a rising course or tilts about a tilt axis which is at least partially parallel to the conveying direction, this reduces the possibility of accumulation of root vegetables on the carrying device by their layering in the transverse direction. In contrast to increasing the number of transverse separating devices, which allows a reduction of the layering of crops in the circumferential direction, this also ensures that root vegetables present on a side of the apparatus or longitudinal separating device remain on this side during circulation, and inspection personnel positioned on the corresponding side always have access to these root vegetables or any foreign bodies present therein.

The apparatus circulates, i.e. is formed closed in the circulation direction, wherein two end regions, which are connected together in the circulation direction and have complementary connecting elements, can be separated from one another, in particular for dismantling. The apparatus is in particular configured as a belt or conveyor belt which is flexible about a bending axis parallel to the transverse direction. During correct operation, at least some of the transported root vegetables are in direct contact with the carrying device. In operation, the carrying device preferably extends below the root vegetables. The transverse direction is a direction at right angles to the circulation direction and in which the width of the apparatus is measured. The interior space surface is a theoretical surface and extends in the transverse direction in particular over most of or over the full width of the apparatus. In side view in the transverse direction, the interior space surface appears linear. In spanned, partially rectilinear course of the device, i.e. viewed in side view, approximately between two deflection rollers, the interior space surface is flat in this respective portion. The receiving regions which contain root crops in operation thus adjoin the interior where they touch the interior space surface, but do not intersect this. In particular, the receiving regions touch the interior space surface at points, lines or superficially.

Viewed in the circulation direction and/or the transverse direction, the apparatus preferably comprises at least three, particularly preferably at least five, in particular at least ten receiving regions next to one another. These adjoin one another in the transverse direction or circulation direction.

Preferably, at least one of the receiving regions is formed as a trough or dish, at least partially and in particular completely. This shape is in particular not continuous, i.e. closed, but with support points arranged along this shape and formed by the carrying device. The receiving region is here open towards the outside, starting from the interior. This design of the receiving region already, even inside the receiving region, counters a movement of root vegetables therein, in particular their rolling inside the receiving region.

The longitudinal separating device is in particular formed elongate. Preferably, the longitudinal separating device extends at an angle to the transverse direction, in particular in the circumferential direction. Preferably, the apparatus comprises several, in particular at least five, preferably at least ten, particularly preferably at least fifteen longitudinal separating devices which are spaced apart from one another locally in the transverse direction. In particular, the longitudinal separating devices run in the circulation direction. With this number of longitudinal separating devices and the resulting, correspondingly high number of receiving regions, for a conventional width of the device, said regions have a width on which only one or at most a few root vegetables may be arranged next to one another, viewed in the circulation direction. The width of the apparatus is in particular 0.3 m to 3 m, preferably 0.5 m to 2.5 m, preferably 0.9 m or 2.4 m.

Preferably, the local distance between two longitudinal separating devices in the transverse direction is between 20 mm and 150 mm, particularly preferably between 30 mm and 80 mm, optimally between 40 mm and 60 mm. The width of the intermediate receiving region corresponding to these dimensions again prevents, as far as possible, the presence of root vegetables lying next to one another in the circulation direction inside the receiving region.

The transverse separating device is in particular elongate. Preferably, the transverse separating device is elongate in the transverse direction, i.e. transverse to the circulation direction. Alternatively, the transverse separating device extends preferably both angled to the transverse direction and also angled to the circulation direction, wherein the extent direction of the transverse separating device in particular encloses with the transverse direction an angle which is less than 60°, preferably 45°. Preferably, the distance between two transverse separating devices in the circulation direction, or orthogonal to the direction of their elongate extent, is between 40 mm and 250 mm, particularly preferably between 70 mm and 130 mm, optimally between 90 mm and 110 mm. Because of the corresponding length, measured in the circulation direction or transversely to the extent direction, of the receiving region delimited by the two transverse separating devices, the presence of root vegetables arranged next to one another in the transverse direction inside the same receiving region is avoided as far as possible. Preferably, each receiving region is designed to receive precisely one root vegetable of normal size which, during operation, is oriented as far as possible with its longitudinal axis parallel to the extent direction of the longitudinal separating device, or alternatively parallel to the extent direction of the transverse separating device.

In a preferred embodiment of the invention, both the extent direction of the transverse separating device and also the extent direction of the longitudinal separating device are oriented at an angle firstly to the transverse direction and secondly to the circulation direction. In particular, the extent directions are each angled relative to the circulation direction by the same angular amount but with different prefixes. Preferably, both extent directions are pivoted by 30° to 60°, in particular 45° relative to the circulation direction. In top view, the transverse separating device and the longitudinal separating device in particular form a checkered pattern. With this design of separating devices, when the apparatus has a rising course in operation, the root crops arranged in the receiving regions are centered automatically because, under force of gravity, they roll in the direction of the lowest node point of the separating devices delimiting the respective receiving region. This allows a maximum spacing between the root crops and optimum visibility of fault points.

The transverse separating device and/or the longitudinal separating device extend in the given directions insofar that, in top view, they run preferably straight therein. The given directions thus represent the main extent direction of the respective separating device, without this having to be continuous in the main extent direction. An at least partial extent approximately in the transverse direction means that the extent direction and the transverse direction enclose an angle which is less than 90°.

In an advantageous embodiment of the invention, the at least one longitudinal separating device is configured such that it circulates with the carrying device in operation. In particular, the longitudinal separating device is connected to the carrying device by force fit or form fit, and in operation circulates with the same circulation frequency as the carrying device. For this, the longitudinal separating device is in particular releasably connected to the carrying device, preferably by screws, catches or clamp elements. Preferably, the longitudinal separating device is guided through shackles or eyelets and thereby supported on the carrying device.

Preferably, the longitudinal separating device is formed integrally with the carrying device. In particular, this side of the receiving region adjoining the interior space surface is formed by a thinner portion of a conveyor belt, whereas the longitudinal separating device is formed by an adjacent thicker portion of the same belt which in particular extends further outward from the interior space surface. As far as possible, this prevents a relative movement between the carrying device and longitudinal separating device, which would cause a movement of root crops present in the resulting receiving region.

Preferably, the carrying device and the longitudinal separating device are at least partly formed by at least one profiled screening bar. The screening bar has a cross-section which is at least substantially constant along its center line, and in particular is rotationally symmetrical about the center line. The center line has a non-straight course. In particular, the center line runs in a plane and/or has a form repeating over the length of the screening bar, and preferably undulates. The at least one receiving region is preferably partly formed by a plurality of such screening bars; in particular, the longitudinal separating device is formed exclusively by the at least one screening bar. With this design, the invention can be implemented with a particularly small number of components which have been reliably used for a long time in the field of root crop harvesting systems.

Preferably, the at least one transverse separating device and/or the at least one longitudinal separating device are at least partly formed, in particular are formed, by a plurality of separating elements which are arranged in a row along their (main) transverse direction and extend towards the outside in side view. These separating elements are in particular not directly connected together. Preferably, a distance between adjacent separating elements is greater than an extent of the separating elements in the transverse direction or in a direction at an angle to the transverse direction. Particularly preferably, the separating elements extend from a separating element root, via which they are arranged on a further component, in a direction orthogonal to the interior space surface, up to an upper, in particular blunt, end region. Here, the separating elements are formed in particular at least mainly rotationally symmetrical about an axis of symmetry parallel to this orthogonal direction, and/or as fingers. In particular, the separating elements are made from a plastic or rubber, in particular cast about a metallic element, and/or are elastically deformable. The separating elements of the transverse separating device and the separating elements of the longitudinal separating device are in particular uniform. This formation of the separating device(s) by the separating elements ensures a gentle handling of the root crops and independence of the boundaries of different receiving regions.

Preferably, adjacent separating elements have a mutual spacing of maximum 40 mm, particularly preferably maximum 30 mm, optimally maximum 20 mm. Preferably, also or alternatively, adjacent separating elements have a mutual spacing of at least 5 mm, particularly preferably at least 10 mm, optimally at least 15 mm. With these spacings, an optimum compromise is found between careful handling of the root crops and best possible mutual delimitation of the receiving regions.

Preferably, the transverse separating device has a transverse separating element extending in its (main) extent direction and/or in the transverse direction, which extends at least partially outside the interior linearly in the transverse direction, and/or on which the separating elements are arranged. The transverse separating element is in particular a preferably cranked screening bar on which in particular the separating elements with their separating element roots are arranged. The transverse separating element is in particular rigid, preferably made of spring steel. In particular, at least a plurality of the separating elements are formed integrally with a screening bar covering or a screening bar attachment which is pushed or placed onto the transverse separating element. The transverse separating element directly achieves a separating effect in the circulation direction, in particular with a rising apparatus course, and/or supports the separating elements reliably.

Preferably, the separating elements extend by at least 15 mm, preferably by at least 20 mm, particularly preferably by at least 25 mm in a direction at right angles to the interior space surface and in particular away from the interior space surface. These dimensions correspond to the height of the separating elements from their separating element root to their end region facing away from the interior. In particular, a clearance of the same height is left between two adjacent separating elements. In particular when the apparatus is designed to convey turnips, the height is up to 150 mm. With these dimensions of separating elements, a separation of root vegetables lying directly on the carrying device is reliably ensured, and at the same time there is no obstruction to the desired distribution of root vegetables over the different receiving regions on delivery to the apparatus; in particular, root vegetables lying in a second layer on the carrying device are excluded from passing over the separating elements.

Preferably, the longitudinal separating device is at least partly, in particular exclusively, formed by a longitudinal separating element which delimits several receiving regions adjacent to one another in the circulation direction. The longitudinal separating element has a greater extent in the circulation direction than a receiving region which it delimits. In particular, the longitudinal separating element surrounds the entire carrying device and/or is attached thereto or formed integrally therewith. Preferably, the longitudinal separating element is a belt which in particular has a round cross-section with a preferred diameter of 12 mm. With this design, the longitudinal separating device is particularly robust in operation and protects the crop.

Preferably, the receiving region is partly formed by at least one forming element extending outward from the interior space surface. The forming element does not extend as far at right angles to the interior space surface as the transverse separating device and/or the longitudinal separating device or their separating elements. Particularly preferably, the forming element extends outward from the interior space surface by 5 mm to 20 mm, particularly preferably by 10 mm to 15 mm. The forming element is in particular cup-shaped. Alternatively, the at least one forming element is finger-shaped and preferably—apart from its extent or length—configured in the same fashion as the separating elements, and forms a support point for a root vegetable arranged in the receiving region. The at least one forming element creates a form of the receiving region which prevents rolling of a root vegetable received therein. For example, forming and separating elements are configured in the manner of profile elements usually protruding from pintle belts.

Viewed in the circulation direction, the forming element is arranged eccentrically between two longitudinal separating devices which are adjacent in the transverse direction. In particular, no forming element is arranged centrally between the longitudinal separating devices, so that a root vegetable arranged in the receiving region may in this zone lie directly on the carrying device. Preferably, at least one forming element is arranged both adjacent to one of the two longitudinal separating devices and also adjacent to the other of the two longitudinal separating devices, in order to form a trough- or dish-shaped cross-section of the receiving region, viewed in the circulation direction. In particular, a plurality of forming elements offset in the circulation direction are arranged adjacent to each longitudinal separating device. Preferably, viewed in the circulation direction, several forming elements, in particular arranged on the same carrier element, are arranged between a longitudinal separating device and the middle of the receiving region delimited thereby. Said elements have a length which diminishes with their distance from the nearest longitudinal separating device, in order to form the cross-section by a larger number of support points in order to protect the root vegetable.

Advantageously, in a refinement of an apparatus according to the invention, the carrying device has cutouts which extend transversely to the interior space surface. The apparatus is in particular a screening belt. Thus admixtures can be effectively separated from the root crops during conveying through the apparatus.

Preferably, the carrying device is at least partly formed by a plurality of in particular rigid carrying elements which are movable relative to one another. In particular, the carrying device has a plurality of screening bars which run linearly in the transverse direction and are arranged adjacent and parallel to one another in the circulation direction. The ends of these screening bars are preferably arranged on lateral endless conveyors, such as e.g. plastic or rubber belts which are configured to run over deflecting rollers and may be driven during operation. With this structure and design of the longitudinal separating device with separating elements, in particular at least one, in particular precisely one, separating element is arranged on each screening bar. Any forming elements are preferably also arranged directly on the screening bars. An outwardly facing top side of the screening bars in particular partly forms the receiving region. Preferably, the screening bars are arranged inside the interior and adjoin the interior space surface.

Preferably, two carrier elements, in particular screening bars, in each case form an integral carrier element unit. The carrier elements are in particular made of glass-fiber-reinforced plastic. Alternatively, the carrier elements are formed from grating segments which are movable relative to one another, or the carrying device is configured as a pintle belt, wherein the end region of the shortest pintle or profile element preferably lies in or touches the interior space surface.

The carrier element is here in particular attached by at least one, preferably two fixing means, such as rivets or screws, to at least two endless carriers. In particular, the endless carriers extend parallel to one another, and/or are elastic and formed, at least over the majority of their circumference, at least substantially integrally and in particular homogenously. The transverse separating device (14)

and/or the longitudinal separating device (16) extends at least partially in the region of at least one of the endless carriers (4) such that a theoretical straight line at right angles to the interior space surface (10) intersects both the endless carrier (4) and also the transverse separating device (14) or the longitudinal separating device (16). The theoretical straight line is at right angles to both the circulation direction and the transverse direction. The transverse separating device and/or the longitudinal separating device thus extends in particular (up to) over at least one of the endless carriers. At least part of the receiving regions preferably extends at least partially above the endless carrier, so that the endless carrier is arranged between part of the receiving regions and the interior. In this way, the surface area of the apparatus usable for conveying is particularly large.

Particularly preferably, the theoretical straight line intersects both the endless carrier and also at least one separating element. Particularly preferably, the theoretical straight line also intersects at least one carrying element and/or a transverse separating element. The separating element is in particular arranged on the carrying element or the transverse separating element. Preferably, the separating element is arranged on the carrying element or on the transverse separating element, such that the separating element is made of a plastic which in particular completely surrounds the carrying element or the transverse separating element. Preferably, a further straight line parallel to the theoretical straight line intersects the endless carrier and at least one of the forming elements or an adjacent receiving region. Thus the receiving regions are formed above the endless carriers and also in between.

The object cited initially is furthermore achieved by a separating apparatus comprising an apparatus as described above or below, an apparatus frame and at least two deflecting elements arranged rotatably on the apparatus frame. In particular, the separating apparatus comprises a drive; preferably, one of the deflecting elements is configured as a drive element for transmission of a torque. The deflecting elements are designed to guide the apparatus such that at least one conveying portion of the apparatus at least partially has an upward slope. Thus the apparatus runs at least partially upward in the conveying portion. Alternatively, the conveying portion at least partially has a downward slope, whereby the apparatus runs at least partially downward in the conveying portion. In particular, the deflecting elements are deflecting rollers which are rotatably mounted on the apparatus frame. The upward or downward slope facilitates the desired arrangement of as few root vegetables per receiving region as possible, since root vegetables present in a second layer in a receiving region slide or roll under force of gravity into an adjacent, in particular following receiving region. As an alternative to the above-described design of the conveying portion, for special application cases of the separating apparatus, at least one conveying compartment of the apparatus has an at least substantially horizontal course.

Preferably, a first conveying portion of the apparatus has a steeper upward or downward slope than a second conveying portion which is adjacent thereto in the circulation direction. In particular, in operation, the apparatus passes over a deflecting element between the two conveying portions. The second conveying portion runs in particular at least substantially horizontally. As the advantage of a rising course of the apparatus has been explained, the advantage of a subsequent less steep or horizontal course is that, there, a relative movement of root vegetables present in the receiving regions towards the apparatus is reduced. The less the root vegetables move about on the apparatus, the easier they are to monitor. The conveying portion or portions thus do not circulate with the apparatus, but are stationary relative to the apparatus frame, inside these portions, the apparatus performs a corresponding function e.g. to settle the movement of the root vegetables.

Preferably, the separating apparatus has at least one slide element which does not circulate in operation and is arranged below at least a part of the conveying portion or one of the conveying portions. The slide element is in particular arranged below the second conveying portion. Preferably, the slide element is a slide rail, over which the apparatus slides in operation, in particular between two deflecting elements, and which thus prevent the apparatus from sagging. Preferably, the separating apparatus has a plurality of slide elements spaced apart from one another in the transverse direction. The at least one slide element prevents or at least reduces the introduction of pulses to the root crops, which could trigger a movement thereof.

According to a further embodiment of the invention, the separating apparatus has at least one impact element which is movable, in particular rotating, during operation. The impact element is configured to generate impacts on at least part of the conveying portion or one of the conveying portions. In particular, the impact element is arranged below the first conveying portion which rises during operation. During operation, the impact element applies force pulses to the apparatus, which are preferably not directed in the circulation direction. Thus the apparatus, in particular in the first conveying portion, is shaken, creating an even distribution of the root crops over the receiving regions. In detail, the impact element is preferably formed as an element rotating in operation and with an eccentric outer contour. Alternatively, and in particular in the case of a profiled underside of the apparatus or endless conveyor running over the impact element, the impact element is configured as an element which rotates in operation and is at least substantially rotationally symmetrical, i.e. preferably as a roller. During operation, the function of the at least one impact element is in particular automated. Preferably, during operation, at least one operating parameter of the impact element, in particular its rotation speed or radius, depends on a setting from a user and/or data, which are preferably originally provided by at least one optical sensor on the apparatus or recorded on one of the machines described below, concerning the conveyed product, in particular a proportion of foreign bodies in the conveyed product or root crops.

In particular, at least one scraper element is arranged above the conveying portion or one of the conveying portions, in particular the first conveying portion, and is spaced by maximum 20 cm, preferably maximum 15 cm away from the interior space surface, and the peripheral surface of which, in operation and in side view, in particular adjoins the forming elements. Particularly preferably, the scraper element is mounted rotatably about a rotational axis oriented in particular parallel to the transverse direction. Preferably, the scraper element is an elastically deformable roller, in particular made of foam material. Alternatively, the scraper element is formed as a retaining rubber or brush. The scraper element serves to hold back root vegetables lying on the carrier element in a second layer, or rolling back in or against the circulation direction, and to reposition these in following free receiving regions.

The object is furthermore achieved by a mobile root crop harvesting machine with a separating apparatus as described above. The object is also achieved by a mobile or stationary transport or cleaning machine with a separating apparatus as described above. In particular, a feeder device is arranged above the first conveying portion for delivering root crops onto the apparatus. Also, the separating apparatus, with a conveying device following the apparatus in the product flow direction, preferably forms a drop step on which preferably a separating unit is arranged. The separating unit in particular comprises a plurality of deflecting elements arranged offset in the transverse direction, which correspond in number at least to the number of receiving regions arranged next to each other in the transverse direction. The deflecting elements are movable from a deflection position, in which they deflect a root vegetable output by an assigned receiving region such that it does not reach the following conveying device, into a starting position in which they are arranged outside the product stream, and vice versa. In particular, the deflecting elements are actuated depending on the information from at least one sensor, in particular a camera, arranged above the (second) conveying portion, which optically detects the root crops or foreign bodies to be deflected.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 4a shows a carrier element of the first embodiment, viewed in the circulation direction.

FIG. 4b shows the carrier element of the first embodiment in top view.

FIG. 11 shows a perspective, detail illustration of the third embodiment.

FIG. 13a shows a transverse separating device of one of the first or third embodiments, viewed in the circulation direction.

FIG. 13b shows a top view of the transverse separating device from FIG. 13a.

FIG. 19a shows a carrying element of the fourth embodiment, viewed in the circulation direction.

FIG. 19b shows the carrying element of the fourth embodiment in a top view.

DETAILED DESCRIPTION OF THE DRAWINGS

Figure 1:
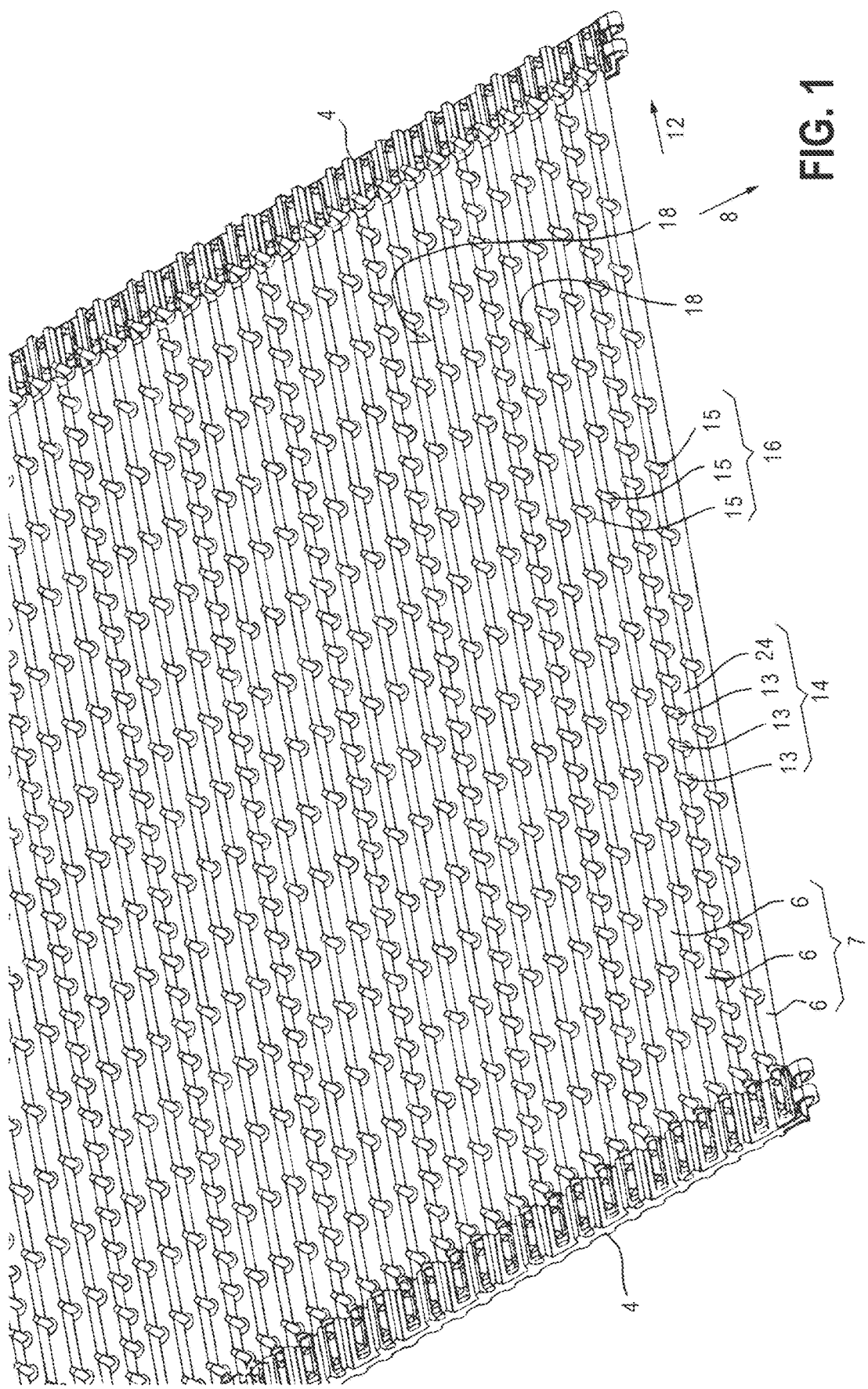
FIG. 1 shows a perspective illustration of a portion of the first embodiment of the apparatus according to the invention.
Figure 2:
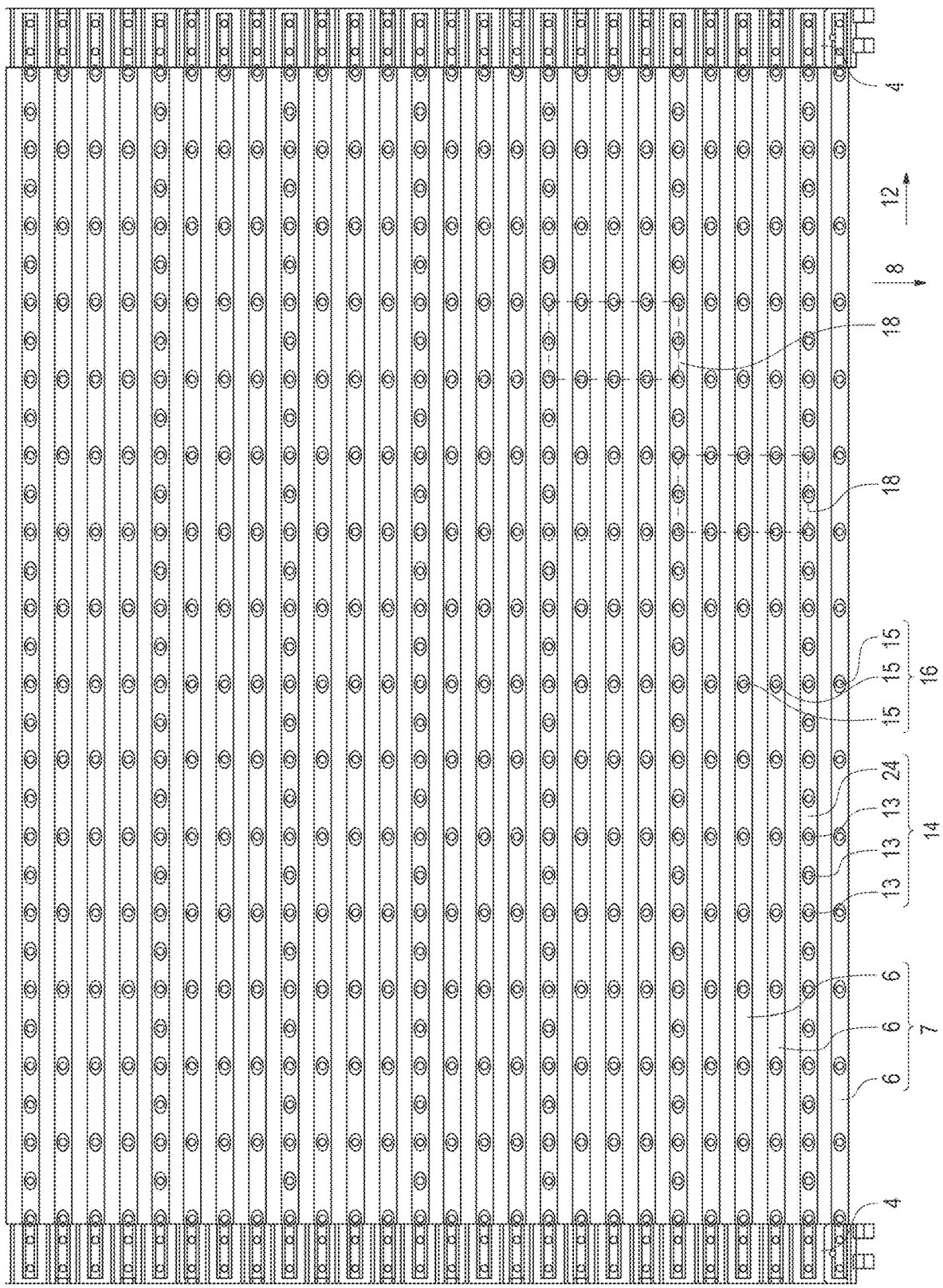
FIG. 2 shows a top view of a portion of the first embodiment.

The features presented below of the exemplary embodiments according to the invention may be the subject of the invention both individually or in combinations other than those illustrated or described. Where suitable, parts with similar function carry identical reference signs.

The illustrated embodiments of the apparatus 2 according to the invention are multipiece belts for conveying root crops. FIGS. 1, 2, 5, 6, 9 and 10 each show only a portion of the respective embodiment, which in each case is shown substantially flat. The end shown can be coupled to the opposite end (not shown) in order to form a closed circulating belt. The embodiments comprise a carrying device 7 which circulates in a circulation direction 8 during operation. This comprises a plurality of carrying elements 6 formed a screening bars (see FIGS. 4a, 4b, 8, 12a and 12b). The carrying device 7 partly forms a plurality of receiving regions 18 which are arranged offset to one another in the circulation direction 8 and/or in a transverse direction 12. The carrying device 7 is configured for carrying root crops.

The apparatus 2 comprises a plurality of transverse separating devices 14 which extend in the transverse direction 12 and delimit from one another receiving regions 18 which are adjacent to one another in the circulation direction 8. The transverse separating devices 14 serve to prevent root vegetables, lying inside the receiving regions 18 on the carrying device 7, from emerging from the receiving region 18.

Figure 3:
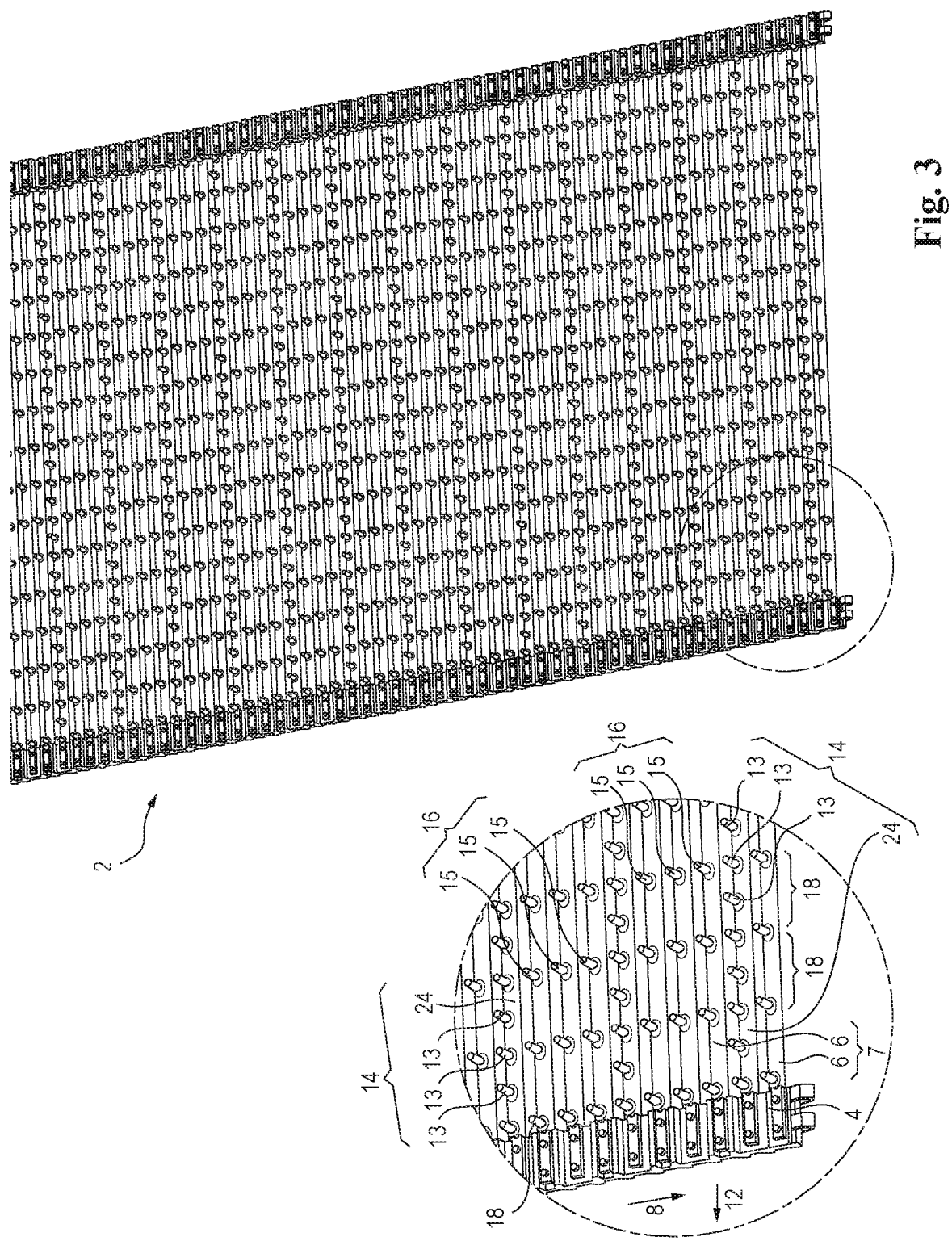
FIG. 3 shows a perspective, detail illustration of the first embodiment.
Figure 5:
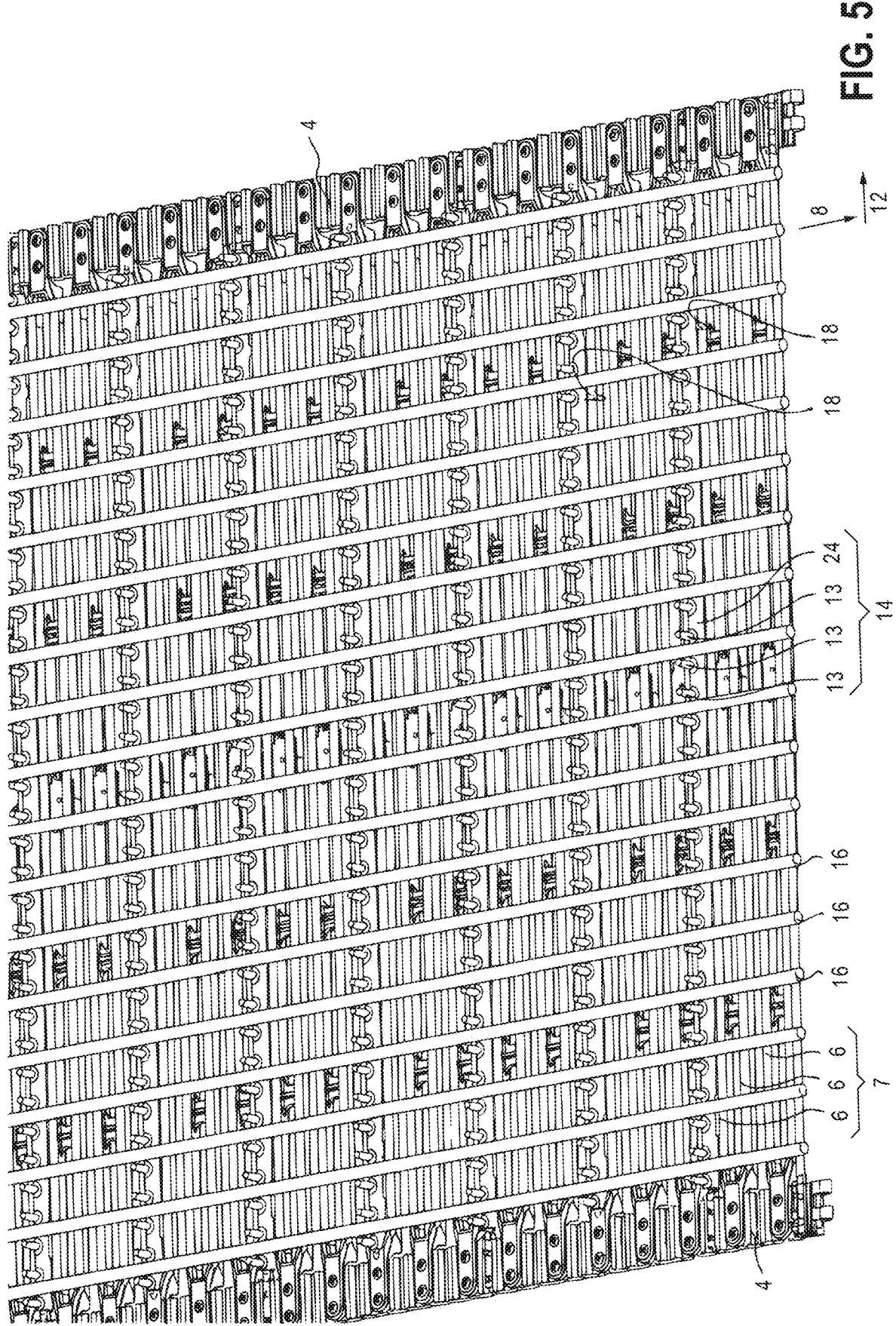
FIG. 5 shows a perspective illustration of a portion of a second embodiment of the apparatus according to the invention.
Figure 6:
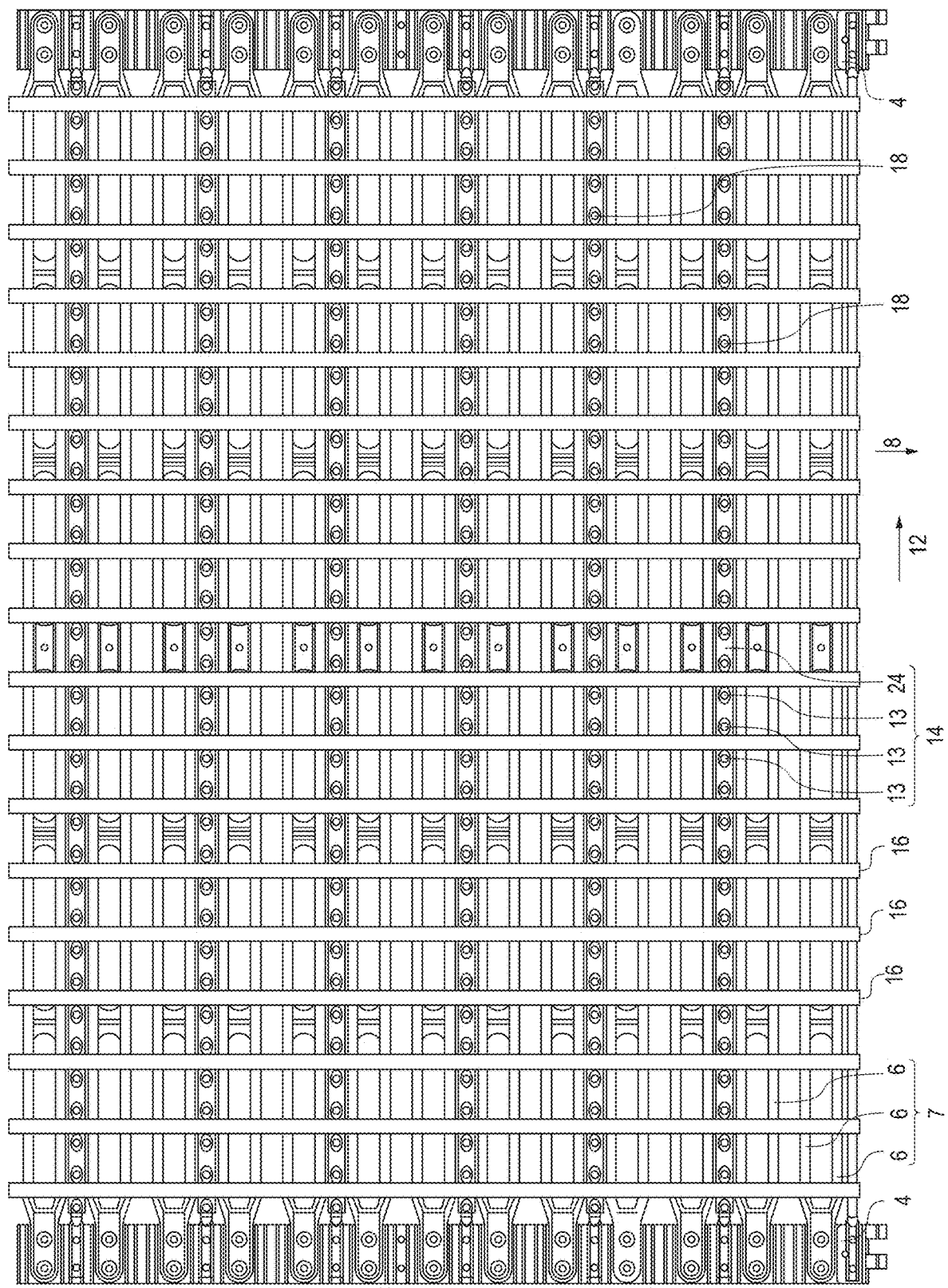
FIG. 6 shows a top view of a portion of the second embodiment.
Figure 7:
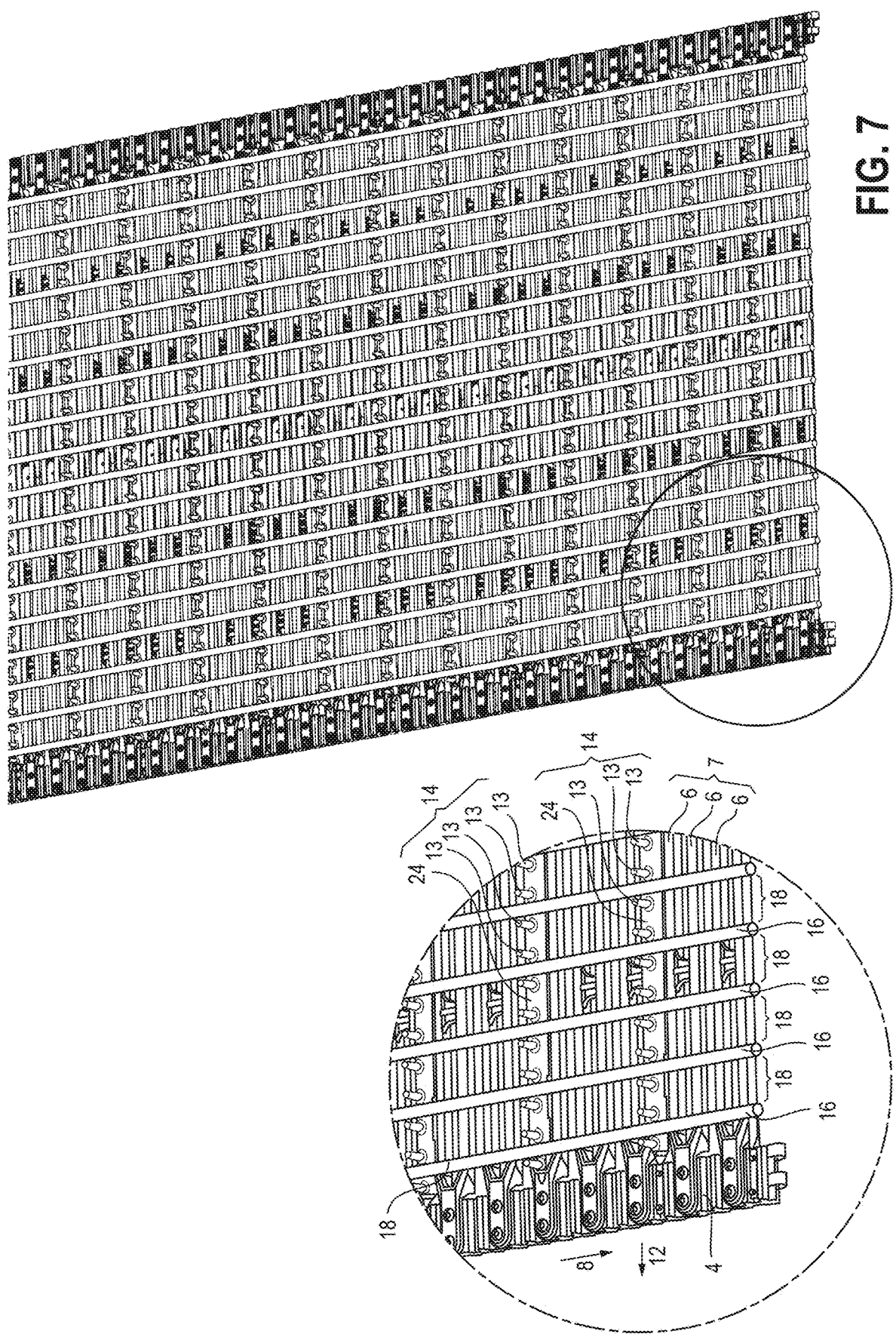
FIG. 7 shows a perspective, detail illustration of the second embodiment.
Figure 8:
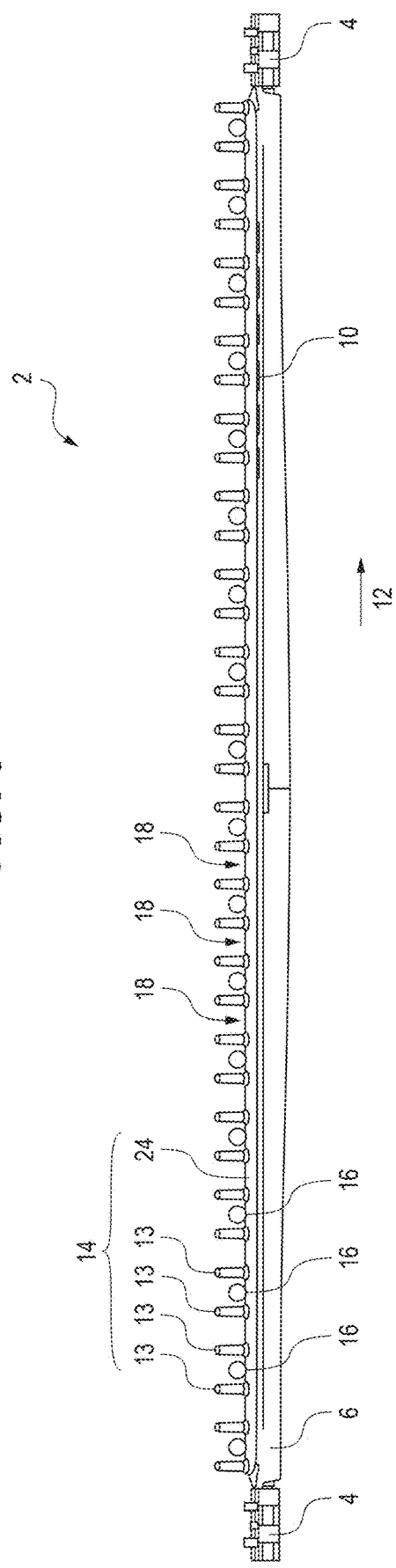
FIG. 8 shows a portion of the second embodiment, viewed in the circulation direction.
Figure 9:
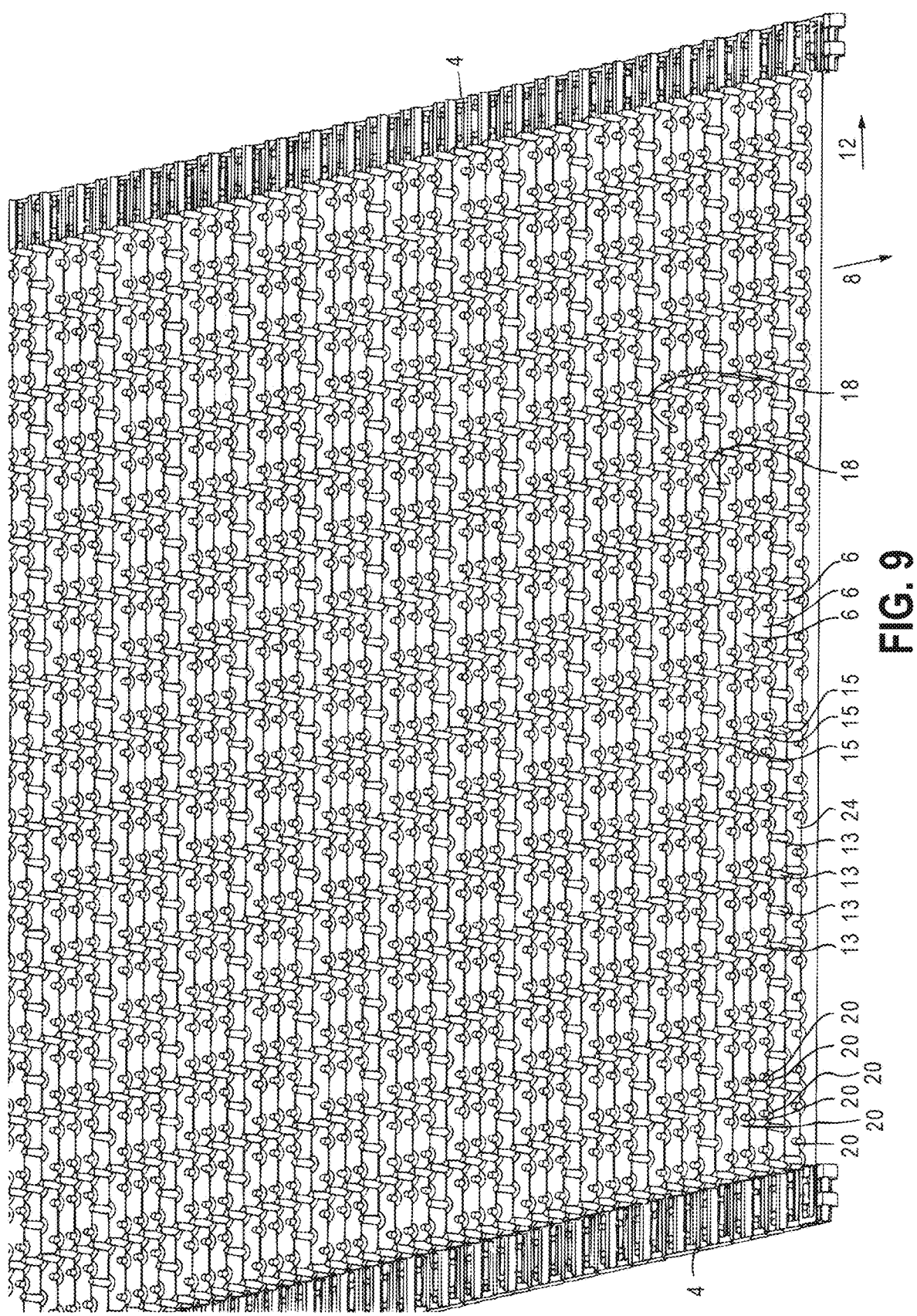
FIG. 9 shows a perspective illustration of a portion of a third embodiment of the apparatus according to the invention.

From the outside, the receiving regions 18 adjoin an interior 11 which extends inside a theoretical interior space surface 10. The interior space surface 10 extends parallel to the transverse direction 12 (see FIGS. 4a, 8 and 12a) and runs exclusively in the circulation direction, viewed in side view. In particular, the lowest part of the receiving regions 18 formed by the carrying device 7 touches the interior space surface 10 or interior 11. The interior space surface portions corresponding to the apparatus portions shown are flat. The interior 11 of the apparatus 2 shown partially in FIGS. 1, 2, 3, 4b, 5, 6, 7, 9, 10, 11 and 12b extends, in the respective perspectives, in each case mainly behind the carrying elements 6 shown. In the top views of FIGS. 2, 6 and 10, the receiving regions 18 are substantially rectangular (see also FIGS. 3, 7, 11).

At least a protruding part of the transverse separating device 14 is arranged outside the interior 11, viewed in side view, i.e. above the interior space surface 10, when conveying root vegetables. This is the case for the first and third embodiments of the separating elements 13 (see FIGS. 13a and 13b); in the second embodiment, also for some the transverse separating elements 24 formed as transverse webs (see FIG. 8).

Three (first and third embodiments) or four (second embodiment) separating elements 6, formed as screening bars, are arranged between two transverse separating devices 14 which are adjacent to one another in the circulation direction 8. In the second embodiment, two carrying elements 6 following one another in the circulation direction 8 are in each case formed as one piece. The carrying elements 6, like the transverse separating elements 24, are attached at the side to two endless carriers 4 of the apparatus 2.

The embodiments of the apparatus 2 shown have a plurality of longitudinal separating devices 16 which extend in the circulation direction 8 at right angles to the transverse direction 12. These devices are arranged outside the interior 11. The longitudinal separating devices 16 each delimit from one another two respective receiving regions 18 which are adjacent to one another in the transverse direction 12. The longitudinal separating devices 16 circulate with the carrying device 7 in operation.

In the first and third embodiments of the invention, both the transverse separating devices 14 and the longitudinal separating devices 16 are at least partly formed by a plurality of separating elements 13, 15, which are arranged in a row in the transverse direction 12 or circulation direction 8 and extend outward in side view. The longitudinal separating devices 16 are formed exclusively by the separating elements 15. The transverse separating devices 14 are formed both by the separating elements 13 and by transverse separating elements 24 running parallel to the carrying elements 6. In the region of their ends, the transverse separating devices 14 are arranged on the endless carriers 4. In the second embodiment of the invention, the longitudinal separating devices 16 are formed by belts running in the circulation direction 8. In this embodiment, two separating elements are arranged between two adjacent longitudinal separating devices 16 per transverse separating device 14; in the other embodiments, one separating element is arranged between two adjacent longitudinal separating devices 16 per transverse separating device 14. The separating elements have a height of at least 25 mm starting from the carrying element or the transverse separating element on which they are arranged.

Figure 10:
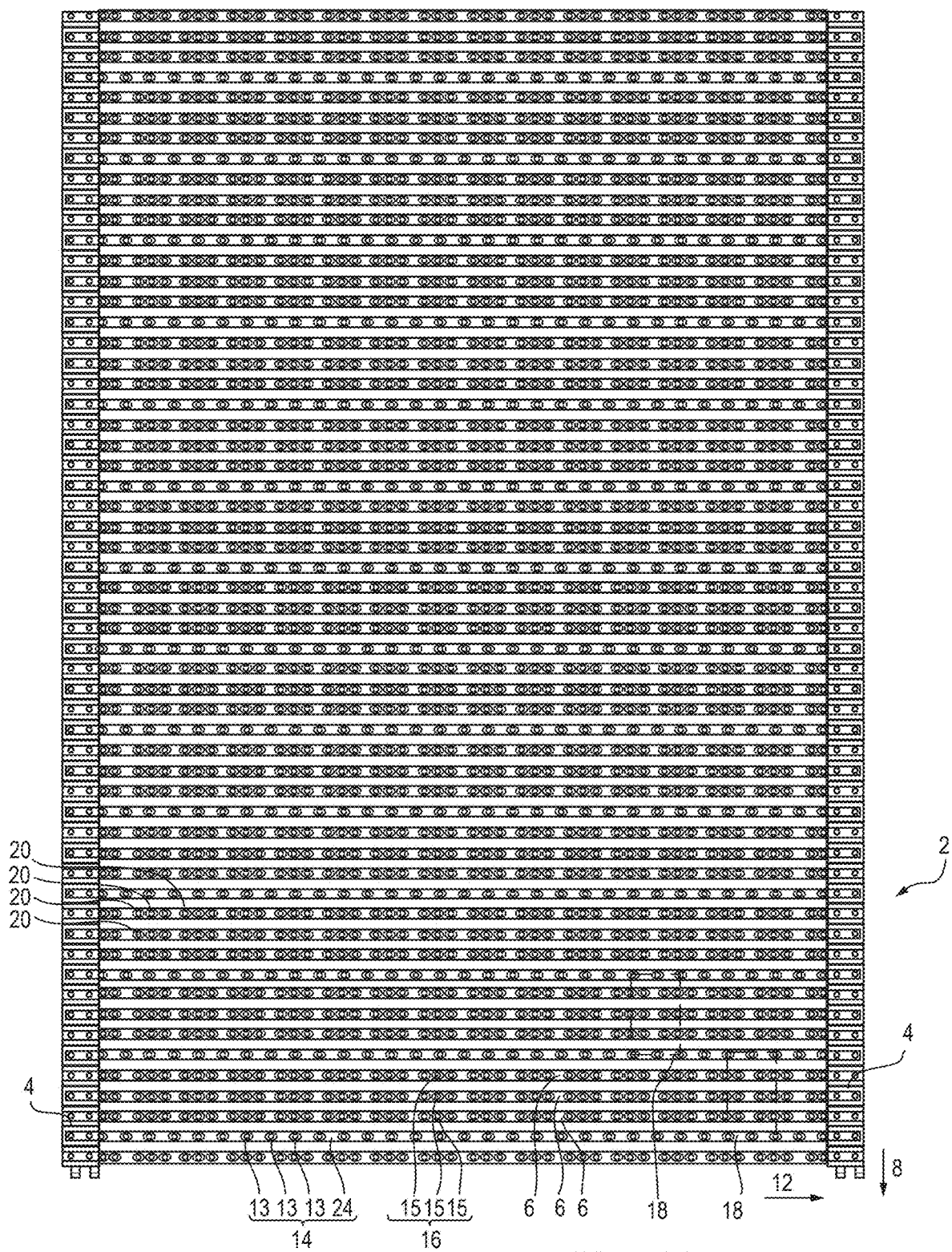
FIG. 10 shows a top view of a portion of the third embodiment.
Figure 12A:
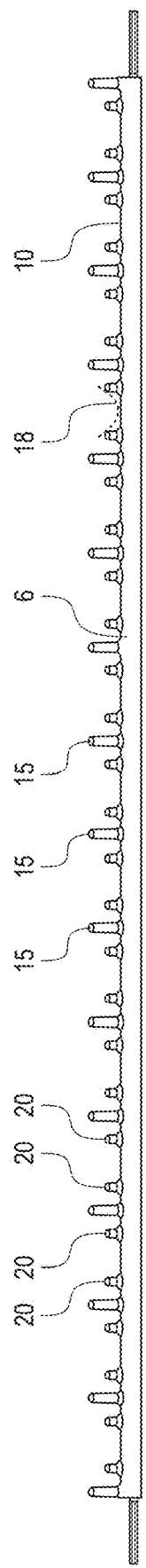
FIG. 12a shows a carrying element of the third embodiment, viewed in the circulation direction.
Figure 12B:
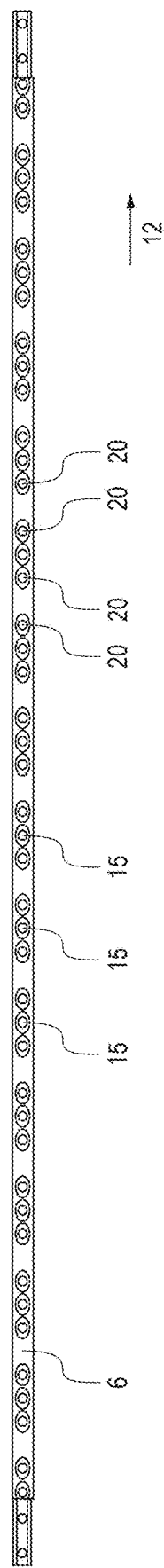
FIG. 12b shows a top view of the carrying element of the third embodiment.

The third embodiment of the apparatus 2 according to the invention has trough-like receiving regions 18 (see in particular FIG. 12). These are formed by forming elements 20 which, in the top view of FIG. 10, are arranged on the carrying device 7 inside the receiving regions 18 and extend outward from the interior space surface 10, but not as far as the surrounding separating elements. Viewed in the circulation direction, the forming elements are arranged eccentrically and adjacent to two longitudinal separating devices 16 delimiting the respective receiving regions 18. In particular, two forming elements 20 are arranged on each carrying element 6 per receiving region 18.

Figure 16:
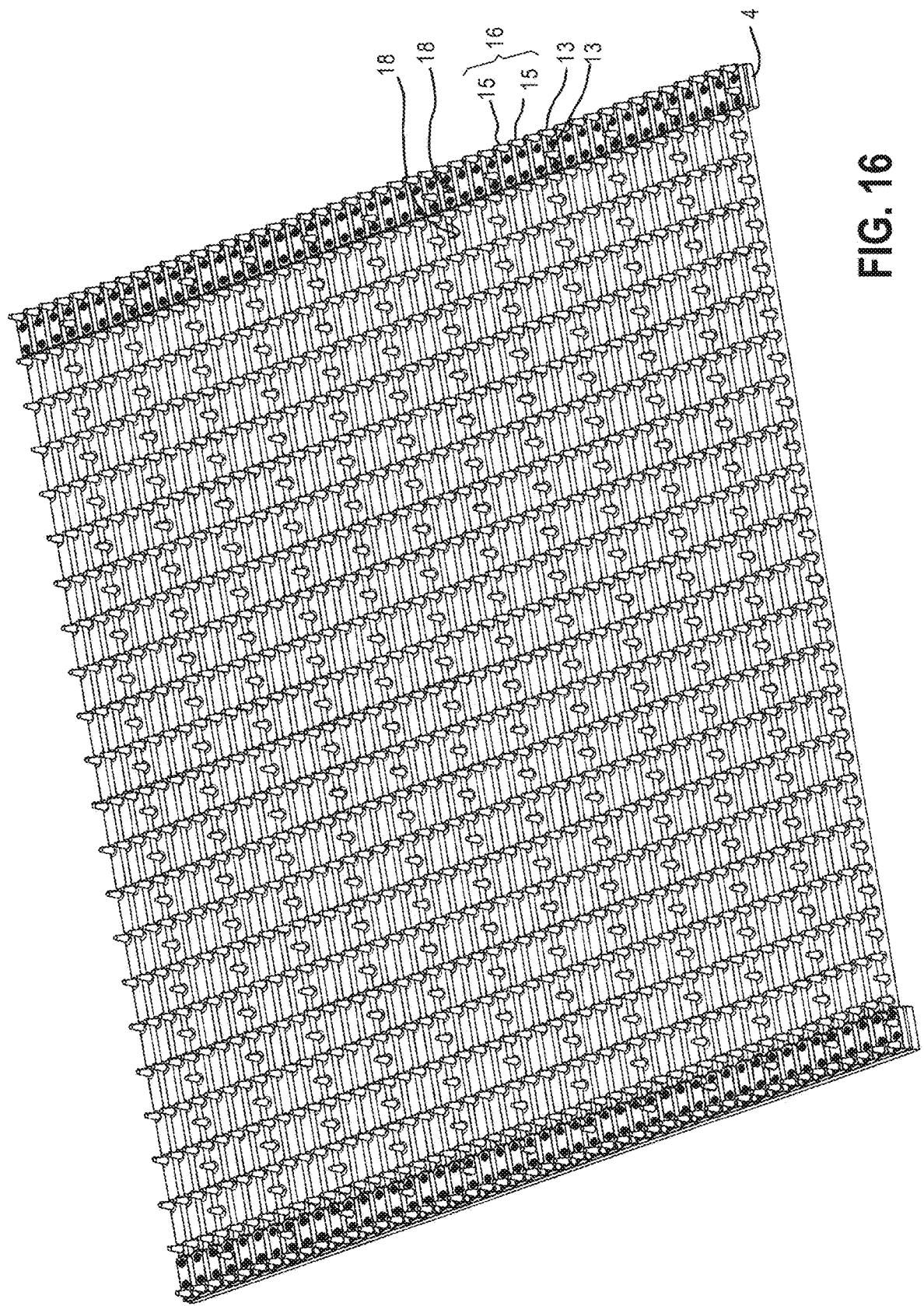
FIG. 16 shows a perspective illustration of a portion of a fourth embodiment of the apparatus according to the invention.
Figure 17:
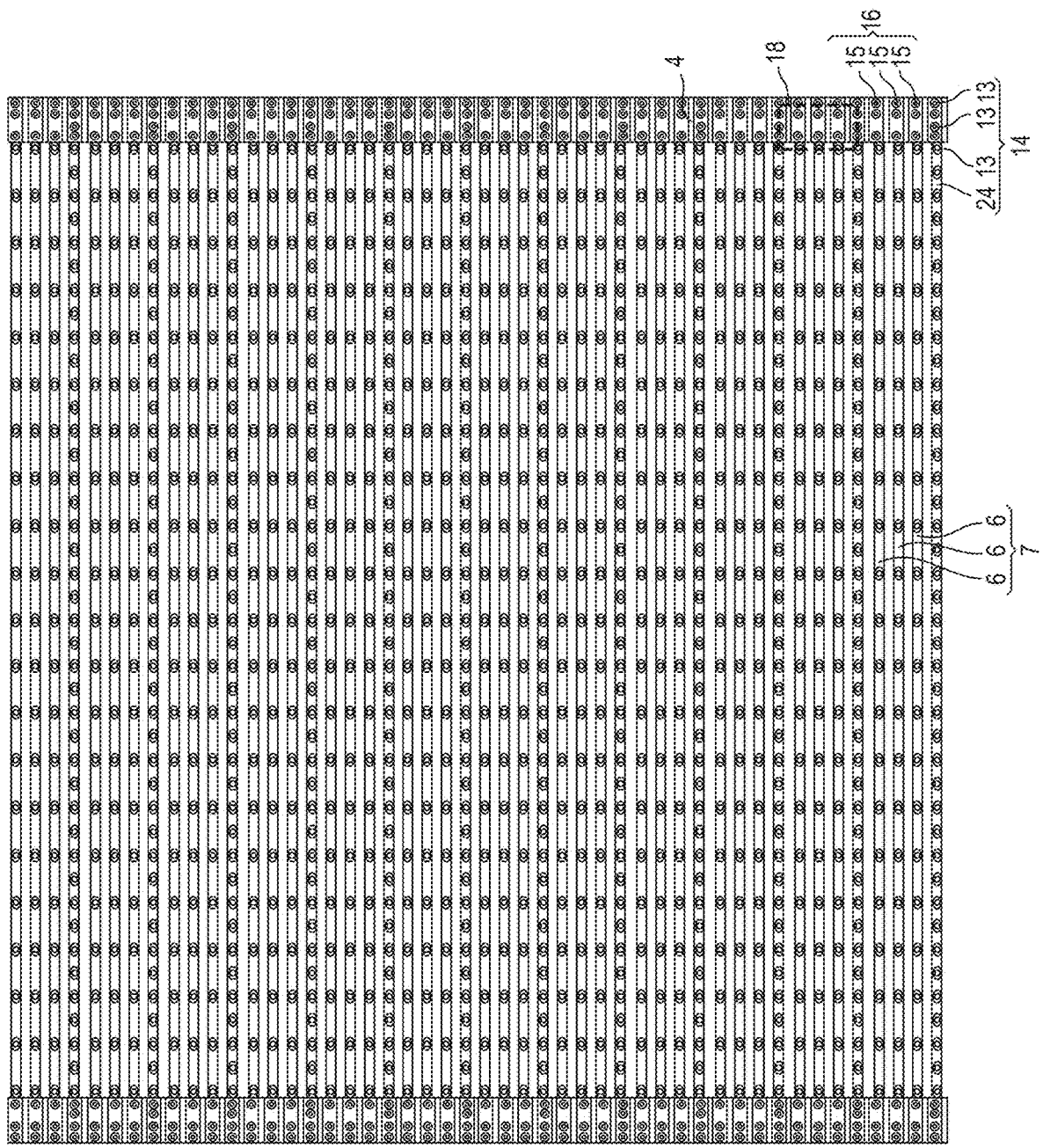
FIG. 17 shows a top view of a portion of the fourth embodiment.
Figure 18:
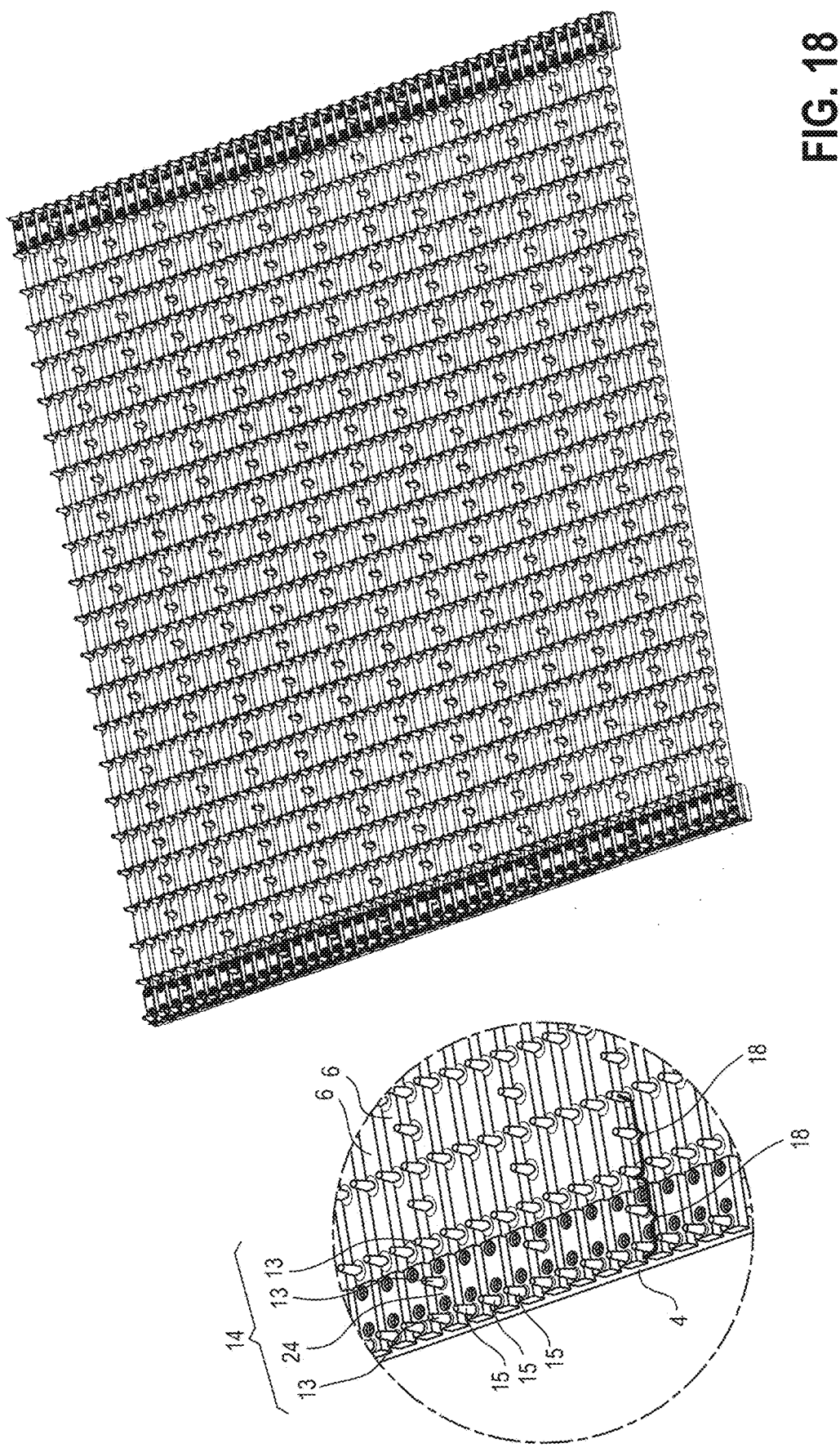
FIG. 18 shows a perspective, detail illustration of the fourth embodiment.

The fourth embodiment of the apparatus 2 according to the invention, as shown in FIGS. 16 to 18, largely resembles the first embodiment. In contrast to the first embodiment, the fourth embodiment has receiving regions 18 which extend mainly above one of the endless carriers 4. To form these, the fourth embodiment has separating elements 13, 15 also above the endless carriers 4, via which the transverse separating device 14 extends up to over the endless carriers 4, and via which a respective longitudinal separating device 16 extends completely over an endless carrier 4 and along an outer edge of the apparatus 2. FIGS. 19*a* and 19*b* show the separating elements 15 also arranged at the ends of the carrying elements 6.

Figure 14:
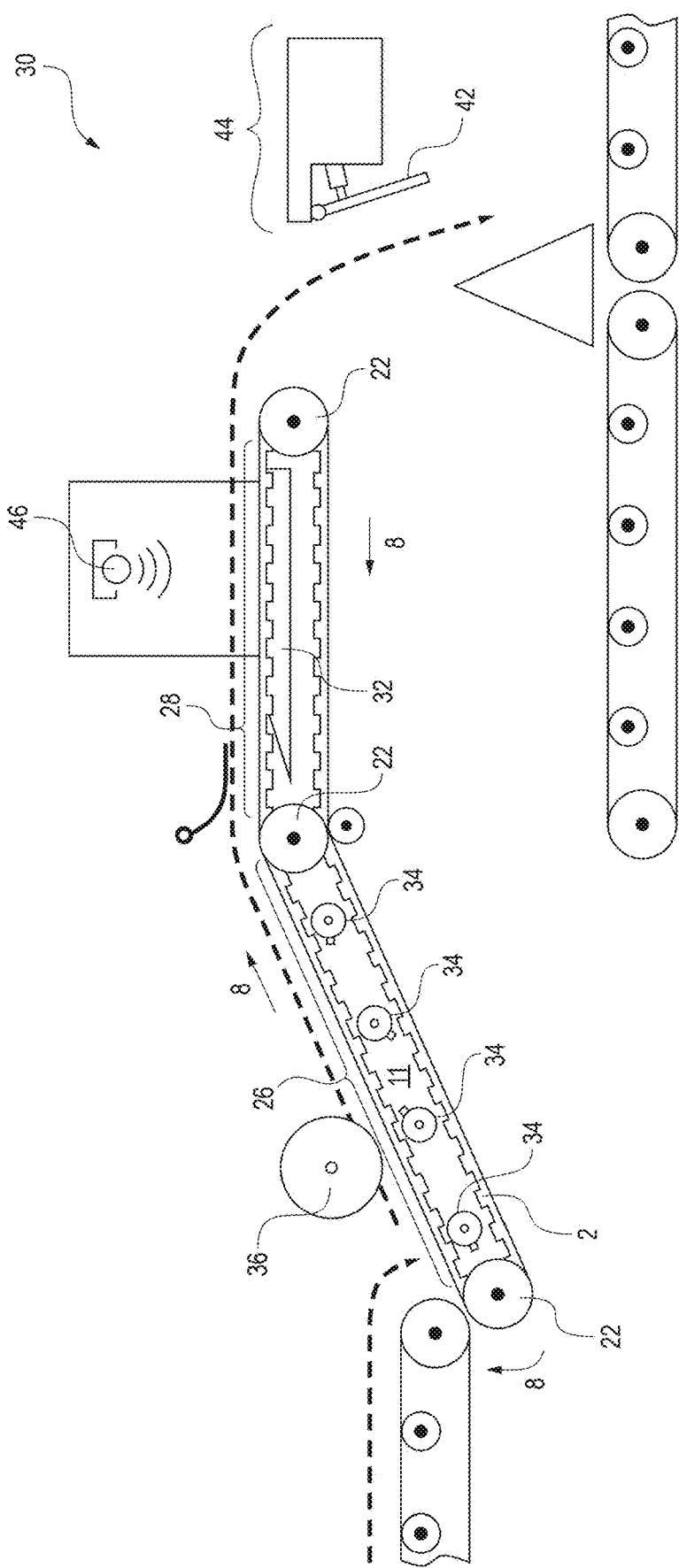
FIG. 14 shows a schematic illustration of a separating apparatus according to the invention in side view.

FIG. 14 shows a separating apparatus 30 with an apparatus 2. The separating apparatus 30 has a rigid apparatus frame (not shown) which does not circulate with the apparatus in operation, and a plurality of deflection elements 22 for guiding the apparatus 2. The separating apparatus 30 forms a first conveying portion 26 and a second conveying portion 28. In the first conveying portion 26, the apparatus 2 has an upward slope, while the second conveying portion 28 adjoining the circulation direction 8 runs horizontally. Below the second conveying portion 28, at least one slide element 32 is arranged, on which the apparatus 2 slides in the second conveying portion 28. Below the first conveying portion 26, at least one impact element 34 is arranged which rotates in operation and is configured to generate impacts on the apparatus 2 in the first conveying portion. Both the slide element 32 and the impact elements 34 are arranged inside the interior 11. Above the first conveying portion 26, a scraper element 36 is arranged which is rotatable in operation and elastically flexible in operation. In particular, a separating unit 44 is arranged on a drop step for the root vegetables, which follows the apparatus 2 in the product flow direction; said unit has a row of deflection elements 42 which are individually controllable and correspond in number to at least the number of receiving regions 18 arranged next one another in the transverse direction 12. The deflection elements 42 are actuated depending on information from an optical sensor 46 which is arranged above the second conveying portion 28 and optically detects the root crops or foreign bodies to be deflected.

Figure 15:
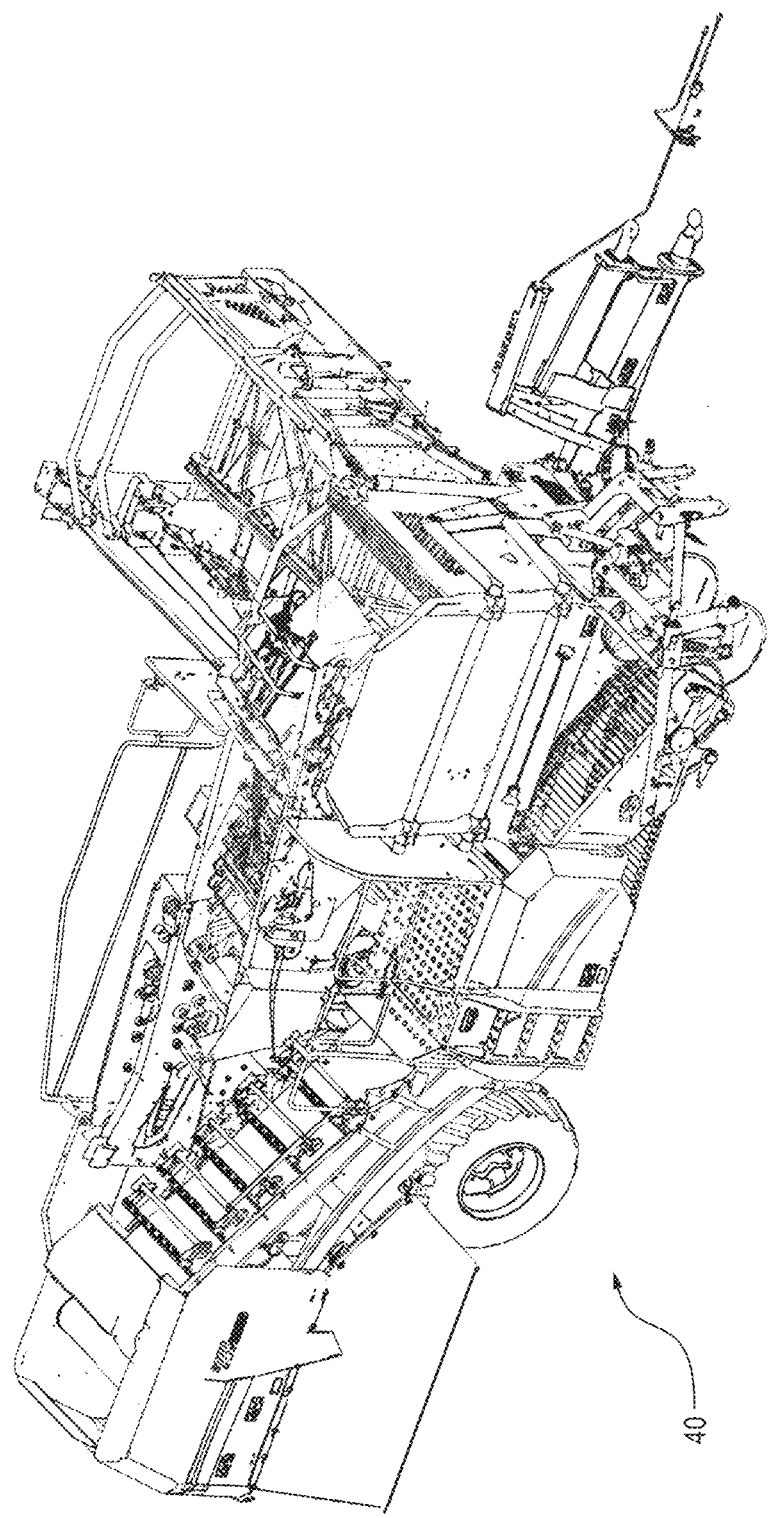
FIG. 15 shows a perspective illustration of a root crop harvesting machine according to the invention.

FIG. 15 shows a mobile root crop harvesting machine 40 with a separating apparatus 30 as described above.

The invention claimed is:

1. An apparatus for conveying root crops, the apparatus comprising:
    a carrying device which circulates in a circulation direction during operation, the carrying device partly forming at least one receiving region, the carrying device being configured to carry the root crops, wherein the carrying device is at least partly formed by a plurality of rigid carrying elements which are movable relative to one another, and further wherein the carrying device comprises a plurality of screening bars which run linearly in the transverse direction and are arranged adjacent and parallel to one another in the circulation direction, and further wherein the screening bars comprise ends which are arranged on lateral endless conveyors; and
    at least one transverse separating device which extends at least partially in a transverse direction and delimits the receiving region in the circulation direction,
        wherein the receiving region from the outside adjoins an interior space which is bordered by an interior space surface extending parallel to the transverse direction and in side view running exclusively in the circulation direction, and wherein at least one protruding part of the transverse separating device is arranged, in side view, outside the interior space,
    at least one longitudinal separating device which extends at an angle to the extent direction of the transverse separating device and parallel to the interior space surface, of which at least one protruding part is arranged, in side view, outside the interior space, and which delimits from one another two receiving regions which are adjacent in the transverse direction; and
        wherein the at least one transverse separating device or the at least one longitudinal separating device is at least partly formed by a plurality of separating elements, which are arranged in a row along the transverse direction and extend towards the outside in side view.

2. The apparatus as claimed in claim 1, wherein the receiving region is formed at least partially as a trough or dish.

3. The apparatus as claimed in claim 1, wherein the at least one longitudinal separating device is configured such that it circulates with the carrying device in operation.

4. The apparatus as claimed in claim 1, wherein the separating elements extend by at least 15 mm in a direction at right angles to the interior space surface.

5. The apparatus as claimed in claim 1, wherein the transverse separating device has a transverse separating element which extends linearly in the transverse direction and at least partially outside the interior and/or is arranged on the separating elements.

6. The apparatus as claimed in claim 1, wherein the longitudinal separating device comprises a longitudinal separating element delimiting several receiving regions which are adjacent in the circulation direction.

7. The apparatus as claimed in claim 1, wherein the receiving region is partly formed by at least one forming element which extends outward from the interior space surface, and does not extend as far at right angles to the interior space surface as the transverse separating device and/or the longitudinal separating device.

8. The apparatus as claimed in claim 7, wherein, viewed in the circulation direction, the forming element is arranged eccentrically between two longitudinal separating devices which are adjacent in the transverse direction.

9. The apparatus as claimed in claim 1, wherein the carrying device is at least partly formed by a plurality of carrying elements which are movable relative to one another.

10. The apparatus as claimed in claim 9, further including at least two endless carriers which extend in the circulation direction on which the carrying elements are attached, wherein the transverse separating device and/or the longitudinal separating device extends at least partially in the region of at least one of the endless carriers, such that a theoretical straight line at right angles to the interior space surface intersects both the endless carrier and also the transverse separating device or the longitudinal separating device.

11. The apparatus as claimed in claim 10, wherein the theoretical straight line intersects both the endless carrier and also at least one separating element.

12. A separating apparatus comprising:
    an apparatus as claimed in claim 1,
    an apparatus frame and
    at least two deflecting elements arranged on the apparatus frame, which mount the apparatus such that at least one conveying portion of the apparatus at least partially has an upward or downward slope.

13. The separating apparatus as claimed in claim 12, wherein a first conveying portion of the apparatus has a steeper upward or downward slope than a second conveying portion which is adjacent thereto in the circulation direction.

14. The separating apparatus as claimed in claim 12, further including at least one slide element, which does not circulate in operation and is arranged below at least a part of the conveying portion or the second conveying portion, for guiding the apparatus.

15. The separating apparatus as claimed in claim 12, further including at least one movable impact element which is configured to generate impacts on at least a part of the conveying portion or the first conveying portion.

16. The separating apparatus as claimed in claim 12, further including at least one rotatably mounted scraper element which is arranged above the conveying portion or the first conveying portion.

17. A mobile root crop harvesting machine with a separating apparatus as claimed in claim 10.

* * * * *